UNITED STATES PATENT OFFICE.

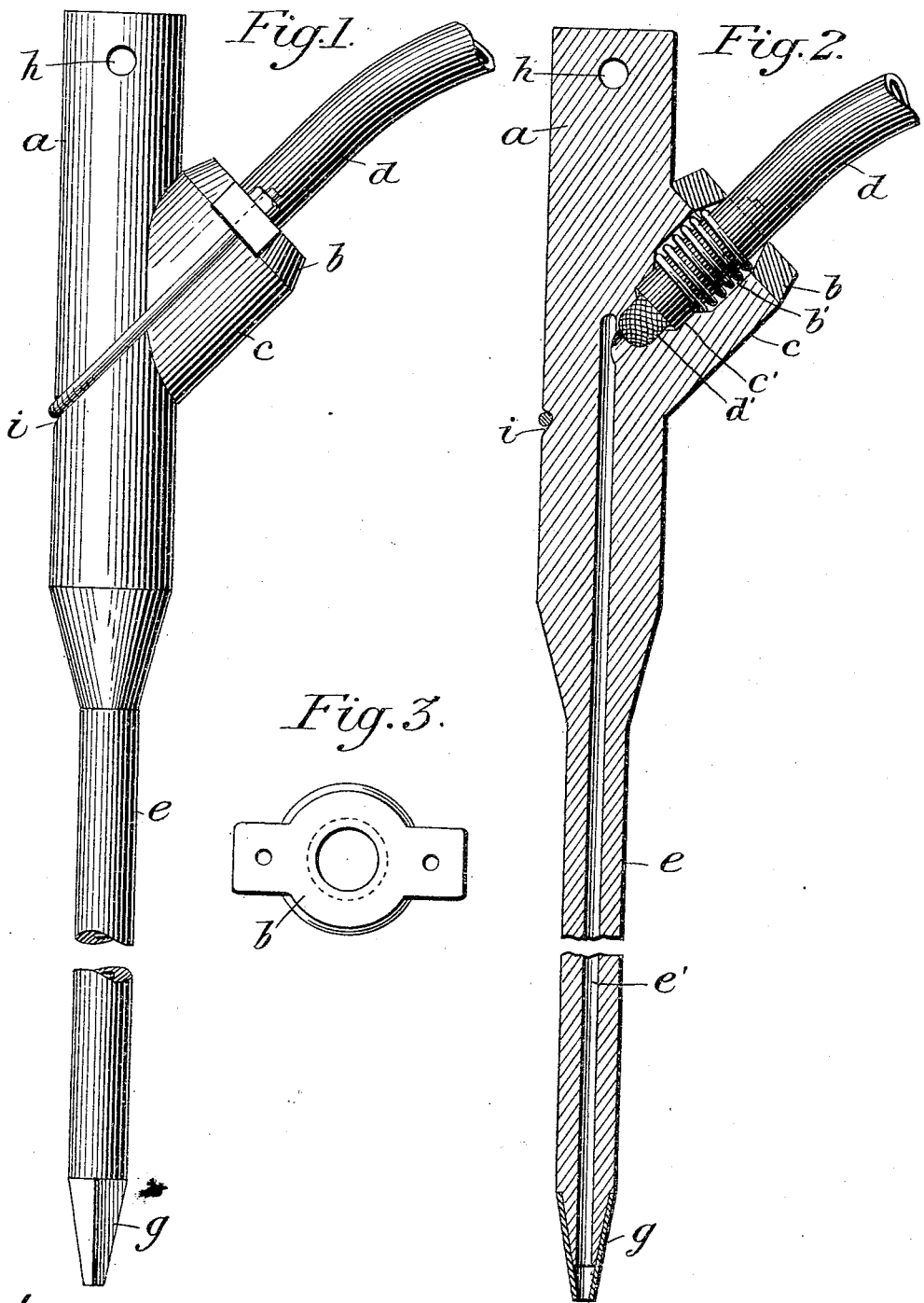

GEORGE H. FINNEGAN, OF FAIRBANKS, DISTRICT OF ALASKA.

STEAM THAWING-TOOL.

958,737.  Specification of Letters Patent.  Patented May 24, 1910.

Application filed February 27, 1905. Serial No. 301,973.

*To all whom it may concern:*

Be it known that I, GEORGE H. FINNEGAN, a citizen of the United States, and resident of Fairbanks, Alaska, have invented a certain new and useful Improvement in Steam Thawing-Tools, of which the following is a specification.

This invention relates to steam thawing tools.

It has for an object to provide an improved driving head, an improved manner of connecting the steam hose to the head, and a screen to prevent the entrance of foreign matter to the point or drill bore.

Other and further objects will appear in the following description and will be more particularly pointed out in the appended claims.

In the drawings: Figure 1 is a side elevation of my invention; Fig. 2 is a vertical section; and Fig. 3 is a detail of a portion of the hose securing means.

Referring more particularly to the drawings, $e$ indicates the shank having a point $g$ at one end and an enlarged driving head $a$ at the other end, a bore $e'$ extending through the whole length of the shank and a portion of the head. The head is provided with a transverse bore $h$ by which the tool is turned in or withdrawn from its hole. The driving head is also provided with a lateral extension $c$ which is formed with a central large bore $b'$, and with a bore $c'$ coaxial with the bore $b'$ and of less diameter than said bore $b'$, and an inclined shoulder $j$ being positioned between the bores $b'$ and $c'$. The extension $c$ is also provided with a bore $d'$ and a bore $k$ both of which are coaxial with the bores $b'$ and $c'$, and communicate with the same and with the bore $e'$ of the tool, the bore $d'$ being of greater diameter than the bore $k$ but of less diameter than the bore $c'$. Within the bore $d'$ is arranged a cup shaped strainer $l$, the open end of which is disposed toward the end of the steam hose $d$ which fills the bore $c'$. The purpose of the strainer, as hereinbefore stated, is to prevent the entrance of foreign matter to the point or drill bore. Secured to the hose $d$ and arranged with the bore $b'$ is a helical spring $m$ which abuts at one end against the inclined shoulder $j$. To hold the hose $d$ to the extension $c$, a ring $b$ with a tapering bore $n$ surrounds the hose and abuts the end of the extension, the other end of the spring $m$ fitting within the bore $n$. The walls of the tapering bore $n$ and the inclined shoulder $j$ serve to clamp the spring about the hose, and thus securely hold the hose in place. The ring $b$ is provided with perforated lateral extensions $o$ through which extend the ends of a V-shaped strap $p$, the strap being positioned to surround the tool and to engage in a notch $i$ to prevent its slipping thereon. The ends of the strap are held to the ring by nuts $q$.

Having thus described my invention, what I claim and desire to secure by Letters Patent is:

1. The combination of a thawing tool provided with a longitudinal bore, and a lateral extension having a pair of axially alined bores of different diameters connected to the longitudinal bore; a hose extending through both bores of the lateral extension, fitting the walls of one of said bores, and having a helical spring surrounding it and arranged within the other bore of the lateral extension; and means engaging the outer end of the spring to hold it and the hose to the lateral extension.

2. The combination of a thawing tool provided with a longitudinal bore and a lateral extension having a pair of axially alined bores connected to the longitudinal bore, the inner bore being of less diameter than the outer one, and the shoulder formed between the two alined bores being inclined; a hose fitting the inner bore; a helical spring located within the outer bore and surrounding the hose, and abutting the inclined shoulder; a ring surrounding the hose and provided with an inclined bore abutting the other end of the spring; and means for holding the ring against the lateral extension.

3. The combination of a thawing point having a lateral extension with a bore leading in through said extension, a hose the end of which is fitted into said bore, and an externally operated clamp having contractible means to clamp and hold the end of the hose within said bore.

4. The combination of a hose, a tapered chamber in which the end of the hose is positioned, a gland surrounding the hose and having a tapered opening registering with said chamber and opposing the taper thereof, and a helical spring compressed in said chamber, with its ends coöperating with said tapered portions.

In testimony whereof I hereby affix my signature at Dawson in the Yukon Territory in the presence of two witnesses this 11th day of October A. D. 1904.

GEO. H. FINNEGAN.

Signed in presence of—
   FRANK J. MCDOUGAL.
   GREGORY MCPEAKE.